US009263170B2

(12) United States Patent
Foss

(10) Patent No.: US 9,263,170 B2
(45) Date of Patent: Feb. 16, 2016

(54) COMPOSITE MATERIAL, HEATING PRODUCTS AND METHOD FOR MAKING

(75) Inventor: Stephen W. Foss, Rye Beach, NH (US)

(73) Assignee: Nonwoven Networks LLC, Naples, FL (US)

( * ) Notice: Subject to any disclaimer, the term of this patent is extended or adjusted under 35 U.S.C. 154(b) by 1046 days.

(21) Appl. No.: 12/323,763

(22) Filed: Nov. 26, 2008

(65) Prior Publication Data

US 2009/0206067 A1 Aug. 20, 2009

Related U.S. Application Data

(60) Provisional application No. 61/066,433, filed on Feb. 20, 2008.

(51) Int. Cl.
*B60L 1/02* (2006.01)
*H05B 3/10* (2006.01)
*H01B 1/24* (2006.01)
*H05B 3/14* (2006.01)

(52) U.S. Cl.
CPC ... *H01B 1/24* (2013.01); *H05B 3/14* (2013.01)

(58) Field of Classification Search
CPC .............. H01B 1/20–1/24; H01B 3/14–3/148; H01B 3/12
USPC ................. 219/202, 211, 212, 213, 217–219, 219/527–529, 542–549; 252/500, 502, 510, 252/511
See application file for complete search history.

(56) References Cited

U.S. PATENT DOCUMENTS 3,457,537 A * 7/1969 Hines ............................ 338/162
5,714,570 A * 2/1998 Kim et al. ..................... 528/279
6,589,647 B1 * 7/2003 Ozawa et al. ................. 428/327
6,770,848 B2 * 8/2004 Haas et al. .................... 219/212
6,814,889 B1 11/2004 O'Grady et al.
6,974,935 B2 12/2005 O'Grady
2002/0137831 A1 * 9/2002 Horibe et al. ................. 524/439
2005/0067406 A1 * 3/2005 Rajarajan et al. ............. 219/553
2005/0112363 A1 * 5/2005 Ning ............................. 428/327
2006/0027555 A1 * 2/2006 Aisenbrey ..................... 219/385
2007/0029307 A1 * 2/2007 Erickson ....................... 219/543
2009/0124746 A1 * 5/2009 Handa et al. .................. 524/496

* cited by examiner

*Primary Examiner* — Sang Y Paik
(74) *Attorney, Agent, or Firm* — Lerner, David, Littenberg, Krumholz & Mentlik, LLP

(57) ABSTRACT

Uniform heating with low voltage electrical power supply is provided by sheet form products as free standing films, coatings, or embedded in laminates, foams and the like and comprising a carbon black/graphite composite dispersed in a plastic carrier.

33 Claims, 8 Drawing Sheets

COMPOSITE MATERIAL, HEATING PRODUCTS AND METHOD FOR MAKING

This application claims the priority date of Provisional Application Ser. No. 61/066,433, entitled COMPOSITE MATERIAL AND METHOD FOR MAKING AND METHOD OF USING, filed on Feb. 20, 2008, which this application incorporates by reference in its entirety.

BACKGROUND

The present invention relates generally to the field of composite materials and, more particularly, to composite materials used for heating products. The art has seen failed or inadequate efforts for attaining highly stable, highly uniform electric heating performance. There is the need for efficient means to provide heat using electricity. Unlike other heating means such as hot air, hot water, thermal oil, or steam, which all require significant capital and equipment, such as boilers, pipes, ductwork, and controls, electrical resistive heating only requires simple circuitry to connect a heating element to the power source and for control.

Most electrical heating equipment is large and requires resistive wires, insulation and high voltages. Examples include electrical blankets with wires and mesh conductors embedded in materials or sandwiched in laminates. Insulated resistive wires are not sufficiently flexible and can break with repetitive flexing. As resistive wires are heated, resistance drops and the temperature increases if the voltage is held constant. To control the temperature state of the art system often require a power control with a feedback from a thermostat or like sensor. This equipment causes concern over sparks and consumer safety. For example, heated seats in vehicles have been the subject of lawsuits and warranty failures because of overheating or wire breakage. In addition, danger of electrocution and burning exists when using electric blankets and heating pads, which are hazardous when the wires are exposed to a conductor.

U.S. Pat. Nos. 6,974,935 and 6,814,889 to Inditherm PLC discuss large area stand-alone carbonaceous films, films coated on substrates or embedded in insulating layers, and laminate forms. One goal of thin planar larger area products is to enhance uniformity of the heating effect, increase safety, operate at low voltage, maintain temperature constant at a given voltage and improve reliability and efficiency of the heating system. In practice the goals were inadequately realized. The goals were realized inadequately in practice of the processes and products described in the patents.

The present invention provides composite materials and products incorporating the materials with enhanced heating uniformity, increased safety, improved reliability and efficiency, as well as methods of making the materials and products that effectively deliver the advantageous properties and performance.

SUMMARY

The composite materials of the present embodiment includes but are not limited to, a mixture of carbonaceous material of particular diverse sizes and morphologies of components dispersed in a carrier matrix. The composite material provides electrical resistance heating and may be implemented in products of extended area forms such as films, sheets, plates, and cylinders, with various densities of solid or porous forms, or as coatings on extended area substrates. Electricity is passed through the composite material portions of such products to effect predictable and stable temperatures at given voltages and the products are stable.

The present invention includes embodiments that provide lightweight, flexible products that create heat using low voltage electricity efficiently, reliably, and with cost-effective construction. The composite material matrix is preferably a film-forming polymer, although not limited to this, intermixed adequate amounts and types of conductive carbonaceous material. The conductive carbonaceous material may be a mixture of at least two carbon types of differing sizes and shapes (morphology), preferably, although not limited thereto, carbon black and graphite. The differing carbon types are heterogeneously admixed over extended area and thickness in a porous but interconnected form of carbonaceous materials forming networks of give current carrying paths of low amperage in x, y, z dimensions aggregating to a selected heating current with the porous structure filled with matrix material adding strength and flexibility to the material and protecting the carbonaceous materials. Because of the multitude of electrical paths resulting in micro-amperes of current in any path, the composite material is well suited for safe operation in damp environments such as roofing walkways, entrance walkway mats, or even shower floors. The matrix is substantially non-conductive in relation to the carbonaceous conductive material. Such products are very simple to use and has no or few moving or complex parts.

The composite material may be rendered in any number of shapes or sizes including, although not limited thereto, sheet, films fiber, tube, foam, or reticulated foam, in any geometric shape. The mixture may be produced initially as a film (or single or multiple deposited layers) by using, for example, although not limited to these, an organic solvent- or aqueous-based carrier. The mixture may also be produced initially as a mass and converted, preferably extruded, although not limited to this process, to a film or other end-use form. For example, the composite material may be formed into fibers that have the ability to generate heat. The composite material may even be constructed in foam form and loaded or coated with the conductive carbon and impregnated on a carrier foam.

The composite material so produced may be further processed, for example, although not limited thereto, by cutting, thermoforming, or punching holes in a macro or micro format for breathability, by adhesive lamination for bonding to substrate materials, or made as a filler of a sandwich configuration. Alternatively, a substrate may be added directly during film formation without an adhesive. The mixture may also be applied to existing structures by painting or spraying it onto the structure.

Because nearly 100% of the energy input is converted into heat, the composite material is extremely energy efficient and meets the need of declining energy resources. The composite material may also be powered with solar energy or fuel cells because of its ability to use low voltage DC power, although not limited to these embodiments.

Due to the uniform dispersion of conductive particles, the product will maintain a constant, predictable temperature at a constant voltage, reducing or eliminating the need for power supplies with feedback mechanisms in many applications.

BRIEF DESCRIPTION OF THE DRAWINGS

For a better understanding of the invention, together with other and further aspects thereof, reference is made to the accompanying drawings and detailed description of the referred embodiment thereof, wherein.

DETAILED DESCRIPTION

The present embodiments are described more fully hereinafter with reference to the accompanying drawings, in which the present embodiments are shown. The following description is presented for illustrative purposes only and the invention should not be limited to these embodiments.

Figure 1:
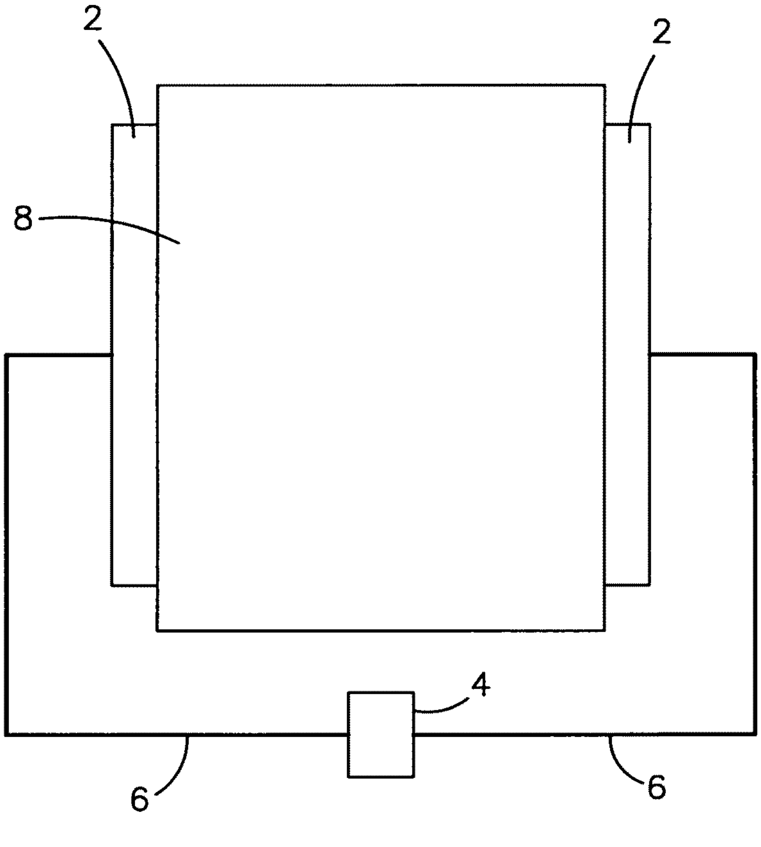
FIG. 1 is a schematic diagram of one embodiment of the composite material in sheet form.

FIG. 1 is a schematic diagram of one embodiment of the composite material produced in sheet form. The composite material 8 in sheet form may have electrical terminals 2 at its ends, although not limited to these positions, so that wires 6 may connect the composite material 8 to a power source 4. In such a way, a current may be sent through the composite material 8 by way of the electrical terminals 2 in order to create an electrical loop with the power source 4. The electricity is converted to heat by the resistance of the composite material 8. The composite material so constructed provides a consistent, predictable heat.

Figure 2A:
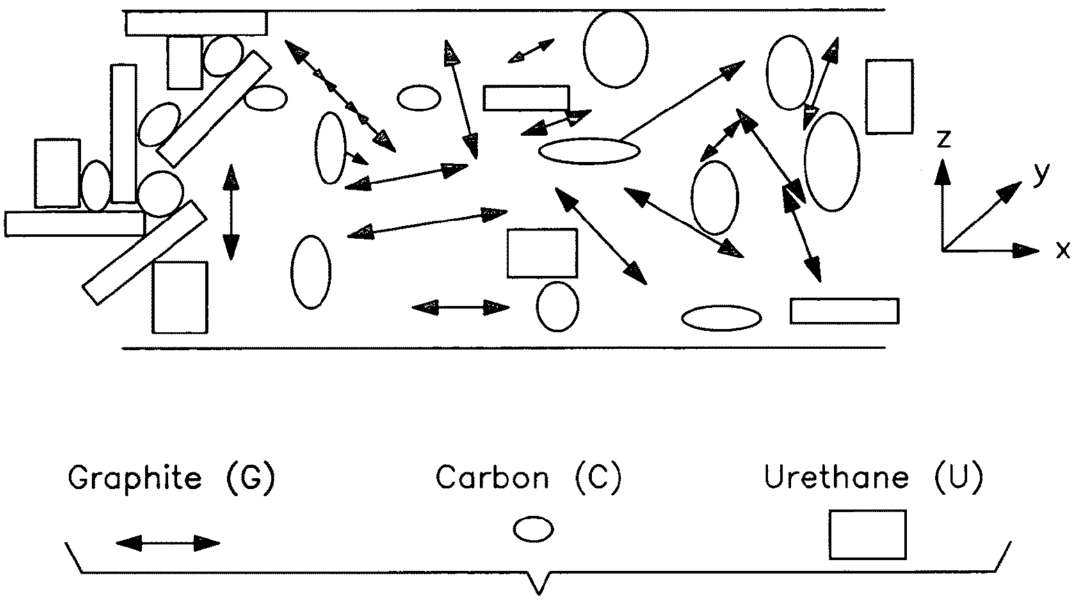
FIG. 2A is a schematic representation of one embodiment of the composite material.

FIG. 2A is a schematic representation of the composite material, which may be constructed from graphite, carbon and urethane, although not limited to these materials. The graphite and carbon are chosen with selected particle shapes to provide close nesting of the particles and excellent conductivity. For example, if only carbon "spheres" are used, then the contacting surface area would be small, resulting in poor conductivity. If only slab like flat particles are used, the material would be overly dense and less effective for resistive heating. The graphite, carbon, and urethane may be mixed together to create a composite material that is conductive, yet provides resistance for heating with low voltage power. Predictable temperature profiles may be established with these materials.

A current is sent through the composite material, conducted by the carbon and graphite, and efficiently converted into heat. It is appreciated that such composite material can be constructed in any number of shapes, sizes, colors and designs, for an almost limitless number of applications. Anywhere that heat is beneficial is a potential use for the composite material.

Figure 2B:
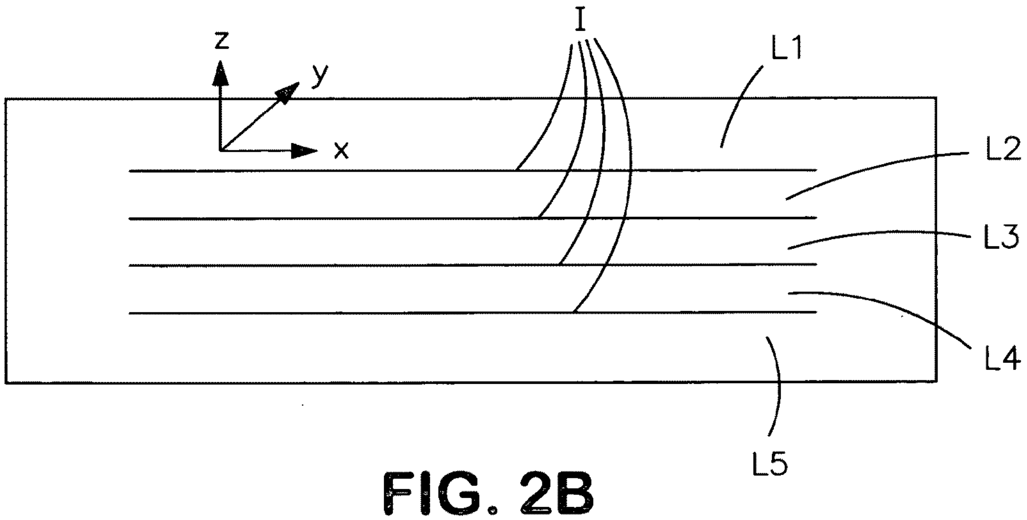
FIG. 2B is a schematic cross-sectional representation of one embodiment of the composite material.

FIG. 2B, is a is a schematic cross-sectional representation of the composite material, which may be constructed from multiple layers L1, L2, L3, L4, L5 of graphite, carbon and urethane mixture shown in FIG. 2A. Numerous electrical paths are created for the current within a single such layer and multiples as so produced. The electrical current is not limited to X and Y axis paths, but can also travel along the Z axis through the multiple layers. Since there are so many electrical paths through the composite material, the composite material may be punched and shaped with little degradation to its ability to create heat. In the preferred embodiment, four layers of the carbon and graphite mixture provide an adequate balance of conductivity and resistance. The layers are preferably produced sequentially in an in-line process with minimal, if any, barrier at the interfaces between layers. In producing the multiple layers, each layer as produced was sufficient at a low temperature to evolve solvent and then is raised to a higher temperature to cure the composite before exposing a melt layer, e.g. about 75° C. and 150° C. for low and high temperatures. These steps avoid formations of a barrier plastic film at lower interfaces that would block conduction from layer to layer.

Figure 2C:
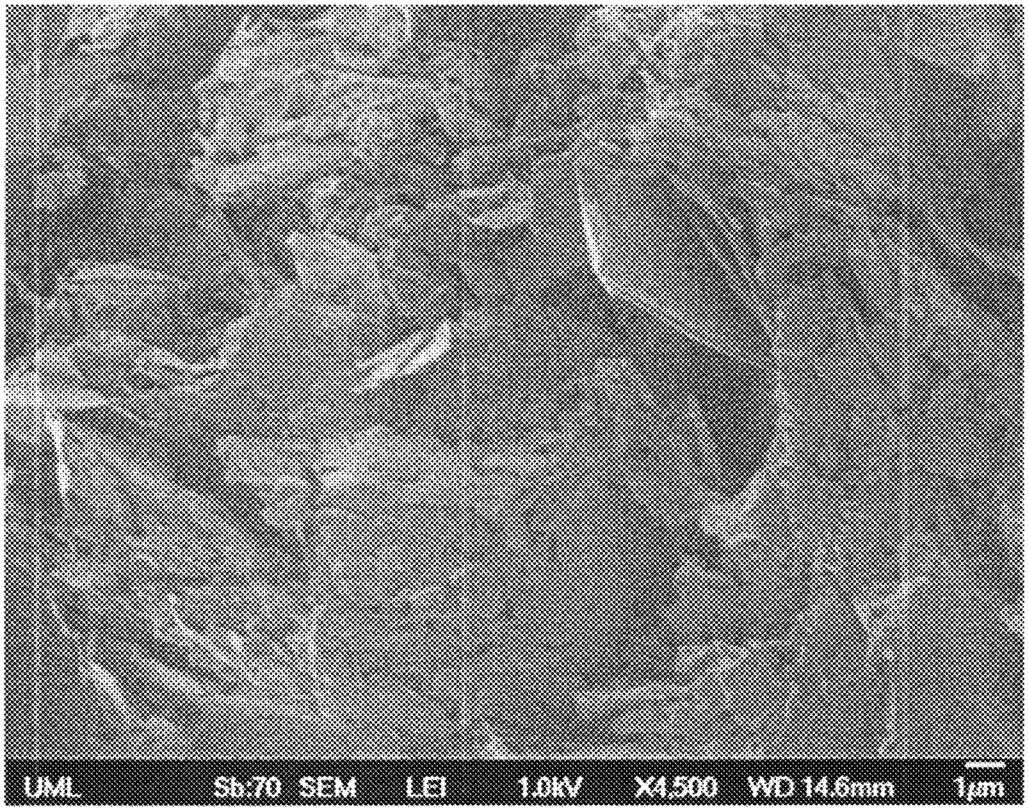
FIG. 2C is a scanning electron microscope image of the composite material. The carbon and graphite mixture provide multiple pathways for an electrical current. The mixture provides a balance of conductivity and resistance heating.

FIG. 2C is a scanning electro-micrograph (SEM) image of the composite showing the diversity of sources L at spherical primary particles of a carbon black aggregates in intimate contact with plate like graphite pieces.

Figure 3:
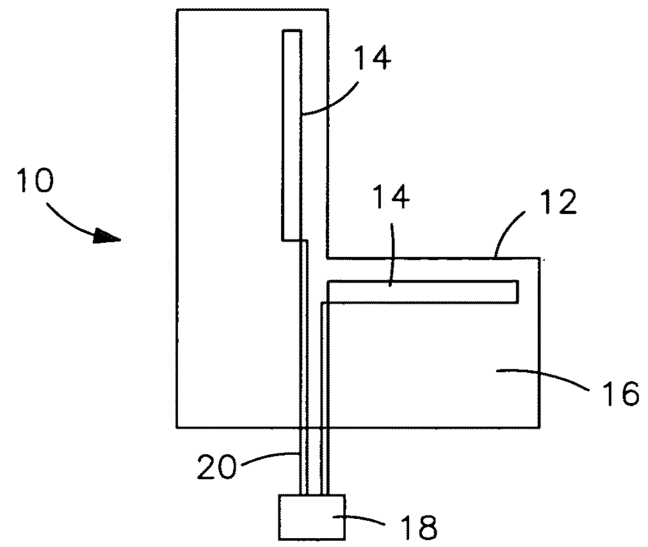
FIG. 3 is a schematic diagram of an embodiment of an automotive seat product incorporating the composite material of FIG. 1, 2A or 2B.

FIG. 3, is a schematic diagram of an automotive seat 10 constructed with composite material 14 of FIGS. 1 and 2A, or 2B. The composite material may be placed between the cushioning foam 16 and the seat covering 12. Wires 20 may connect the composite material 14 to an electrical source 18 to provide power to the composite material 14. The electrical source 18 may variably control the temperature of the composite material 14 to provide adjustable heat to a passenger seated in the automotive seat 10. The composite material so constructed may be powered by the car's own battery directly or ia a power conversion device or have its own power supply, although not limited to these embodiments. Switches and status indicators, known per se, can be provided. It is an attribute of preferred embodiments that resistivity (heating effect) of the material does not change with temperature of the operating range (i.e. resistivity does not decrease/current does not rise with temperature) so that a runaway condition does not occur. This effect is a safeguard against fires apart from safety devices such as thermal detectors and current cut-off or reduction devices activated thereby.

Because of its small size, composite material 14 constructed in sheet form may be incorporated into any number of products. As shown here, the composite material 8 in sheet form is sandwiched between layers of the seat cushioning foam 16 and the seat covering 12. But the composite material 14 could be used in a near limitless number of products. Furthermore, the composite material 14 may be produced in thicker shapes using molds, although not limited to this embodiment.

The composite material disclosed herein is particularly effective for the construction of automobile seats. The resistance of the composite material does not change with its temperature. Therefore, it is self-regulating because constant voltages will product a constant temperature. This contrasts traditional heating methods for automobile seats (e.g., heated wire coils, etc.), which can get hotter and hotter with a constant voltage. These traditional methods have been known to cause burns to the user of the seat or even cause fires.

Some automobile seat manufacturers construct seats by pouring material such as foam into the seat covering (e.g., leather, etc.). This method of construction requires a barrier layer so that the foam does not adhere directly to the seat covering. In this case, the composite material disclosed herein could provide dual purposes of the barrier in the construction of the seat as well as providing heat once the seat is constructed.

Figure 4:
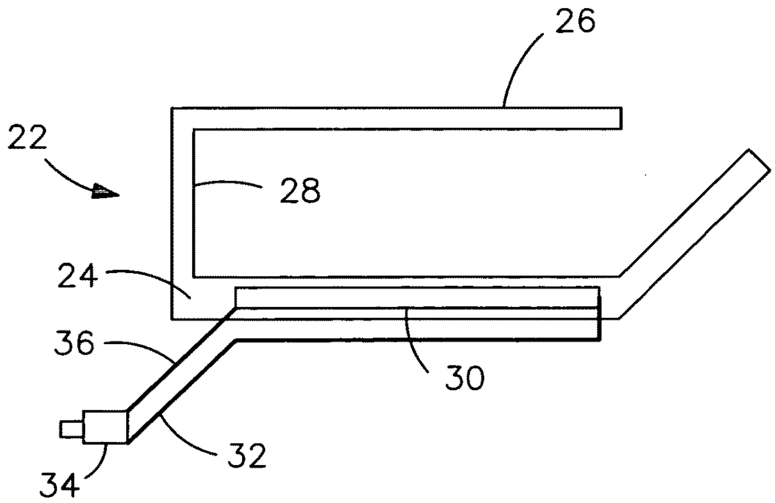
FIG. 4 is a schematic diagram of a food delivery container incorporating the composite material of FIG. 1, 2A or 2B.

FIG. 4 is a schematic diagram of a food delivery bag 22 constructed with the composite material 30 of FIG. 1, 2A or 2B. The composite material 30 may be placed within the foam insulating layer 24, between the container's inside lining 28 and its durable outside layer 26. The placement of the composite material 30 may provide heat to the container to keep its contents warm.

A supply wire 32 or wires may provide the composite material 30 with a positive charge of electricity. A return wire 36 or wires may complete a loop, permitting the electricity to flow through the composite material 30. The supply wire 32 or wires and return wire 36 or wires may be connected to a plug 34 or plugs so that the composite material 30 may be powered by any number of convenient power sources. For example, although not limited to this embodiment, the plug 34 or plugs may be shaped to fit into a vehicle's cigarette lighter. Because the composite material does not require large voltages, a portable battery pack may be used. This may be beneficial for food delivery people who may require the use of a warm bag to deliver hot food. In fact, any delivery application that requires warmth may be a suitable application including, although not limited thereto, transporting blood plasma.

A temperature control may also be incorporated to vary the temperature of the composite material 30. A temperature control may be incorporated into a power source, the supply wire 32 or wires, or the return wire 36 or wires, although not limited to these embodiments, and may provide a range of settings for the user to control the flow of electricity and the amount of heat generated.

Figure 5A:
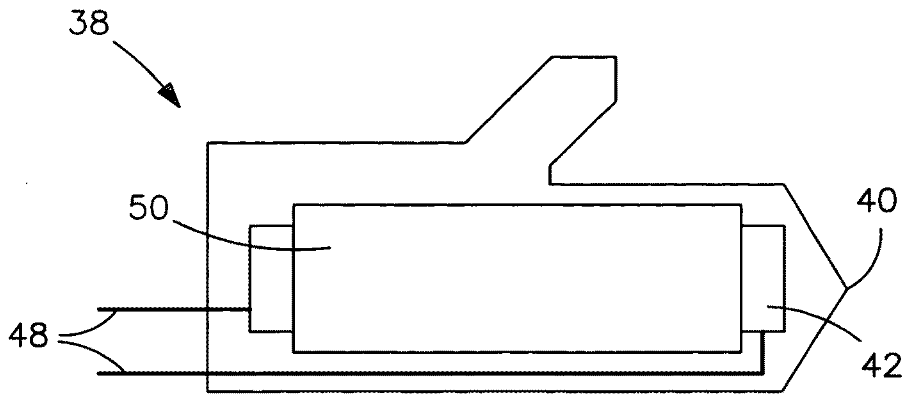
FIGS. 5A and 5B are schematic diagrams of a mitten incorporating the composite material of FIG. 1, 2A or 2B.
Figure 5B:
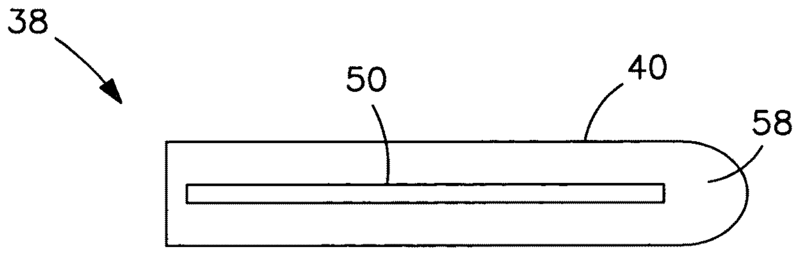

FIGS. 5A and 5B are schematic diagrams of a mitten 38 constructed with the composite material 50 of FIG. 1, 2A or 2B. The composite material 50 may be placed between the mitten's lining 58 and its outer layer 40. The composite material 50 may have a electrical terminals 42 or devices to allow a wire or wires 48 to be connected to the composite material 50. The other end of the wire or wires 48 may be connected to a power source. When powered, the mitten 38 may provide warmth to the wearer's hand or hands. The composite material may be powered by lightweight, low-voltage batteries, although not limited to this embodiment. It is to be appreciated that the mitten is but one example of the many applications for the composite material in clothing. For example, although not limited thereto, footwear, hats, jackets, etc., could all incorporate such a heating device.

A complete or near complete dispersion of the carbon and graphite in the composite material is important. The addition of dispersing agents and coupling agents improves the wettability of the liquid components during compounding and ensures the uniform distribution of the particles. Further, the choice of carbon and graphite particles of different shapes may enhance continuous contact between the conductive particles, increasing conductivity and reducing resistance. Conversely, the over-compounding of the dispersion can cause an insulating effect of the carrier polymer coating the conductive particles, reducing the heat effect.

By varying the carbon and graphite types and ratios, a predictable heating profile may be created. By varying the matrix and/or proportions of conductive carbon/graphite relative to the matrix, various attributes of stiffness, flexibility, and extensibility may be created. Also by varying the carrier, other attributes such as strength, elongation, resistance to moisture and solvent, resistance to ultra-violet degradation, and resistance to bacteria may be enhanced.

Carbon black exists as aggregates of primary particles. Prime particles with considerable branching are referred to as high structure blacks. However, high structure blacks are very difficult to disperse. Graphite particles are shaped as plates or other geometric structures that have high surface area but are also very difficult to disperse into individual particles.

By combining conductive carbon and graphite with a flexible, dispersible, film-forming polymer, the conductivity and resistance can be controlled to provide, reliably, a desired temperature at a prescribed voltage. The composite material works very well with DC voltages from 3 to 50 volts (provided by batteries or other power supplies), although it is not limited to these voltages. Higher voltages may be used, creating even higher temperatures. The composite material may also be used with pulsed DC or AC voltages at variable frequencies, which may require larger and more costly power supplies.

Initial work was performed utilizing various carbon black powders from suppliers. Most standard carbon blacks are made for use in inks and tires. Some carbons are designed for use in wire insulation to provide a partially conductive path for RE energy to ground. Most carbon black is produced in a "prill" form that is a loosely bound aggregate of carbon particles. It was determined that these aggregates were difficult to disperse into individual particles, but can be satisfactorily dispersed with the use of compatibilizers.

It was determined that Vulcan® XC72 or XC72R ("XC72") manufactured by Cabot Corporation provided reasonable results. XC72 is conductive black carbon designed for power cables, but is widely used in plastics for electrostatic discharge products.

Cabot Corporation's Black Pearl® 2000 ("BP 2000") provided better results because it has a very fine particle size with a large surface area. It is made as 'furnace blacks' derivatives of heavy residual oils. BP 2000 is a very high structure carbon black aggregate with considerable branching and chaining. It is made as furnace blocks from liquid heavy residual oils (almost aliphialtic). This makes it extremely conductive (but with adequate resistance to low voltage heating), although it is very difficult to disperse.

Conductivity of the BP 2000 carbon black follows an asymptotic curve and does not occur until a solid composition containing it has at least about 24% carbon black by weight. Through trials it was determined that until 26% by weight is reached, conductivity was uncontrollable because of variability in mixing and dispersion. Preferred compounds may range from 30% to 50% of content of carbon black or like structured carbon by weight of carbon black or like carbonaceous material, although they are not limited to these percentages. Varying the carbon content varies the conductivity. Thus, the product can be tailored for individual requirements. However, as the carbon black is increased to 26% and above, the film quality may suffer and become stiff and easy to tear.

Carbon black alone will not provide the robust properties needed to meet various requirements. The addition of a highly conductive graphite as a source of further carbonaceous material increases the conductivity and costs less while providing a useful diversity of carbonaceous materials—diverse as to size, morphology, compositional (crystallinity) and conductivity. The size and morphology difference provide a nexting of the diverse carbonaceous materials. The graphite may be of high purity in excess of 98% by weight carbon content, with 99+% preferred, although not limited to these percentages.

Commercially available MetalPURE™ and ThermoPURE™ brand graphites include many different types of graphite, including purified crystalline flake graphite. Graphite Technology Group, Inc. also offers a wide range of pure, crystalline flake graphite. Crystalline flake graphite is a naturally occurring crystalline form of carbon that has high thermal and electrical conductivity and is resilient. Graphite Technology Group, Inc. sells product M103 ("M103") which is 99+% carbon and worked very well. M103 graphite is 4.5-5.5 microns in size (50 wgt-% under 5.1 microns) and is shaped like flat plates and rods.

The result of combining these differing uniquely shaped particles creates conductive paths in all of x, y, z directions and in between. Since graphite is more economical than BP2000 or the like, the combination is more cost effective as well. Further, the intermixture of the carbon black and graphite of differing sizes and geometric shapes appears to improve the strength of the film.

A wide range of carriers (matrices) may be used. It was found that better results occurred with aliphatic urethanes because of their softness and flowability (low viscosity) and, also, toughness and resistance to sunlight, although the composite material is not limited to these materials. These aliphatic urethanes create superior conductivity/resistance when loaded with the carbon/graphite material compared to aromatic urethanes. However, the latter can be used for some applications. Carriers such as olefins, ethylene-vinyl-acetate (EVA), polyester, acrylics, nylons, SBR, styrene acrylates, thermo-plastic rubber (TPR), and other thermoplastic and thermoset polymers, although not limited to these materials, can also work with varying properties.

Dimethyl formamide ("DMF"), used as a solvent for the urethane before and after combination/dispersion of the carbon/graphite solids, is miscible with water and a majority of organic liquids. Alternative solvents include, but are not limited to, toluene, isopthalic acid, and isobutyl alcohol. Rohm & Haas Company provides high performance aliphatic resins such as Vitbane 6035 ("6035"), which is an aliphatic urethane dispersed in DMF. 6035 has been tested to good effect. It carried the dispersed carbon and graphite very well and produced a fairly tough, flexible film. However, as the loading was increased to increase conductivity, it lost much of its strength.

Certain Formulas I and II used for making the composite material, although not limited thereto, were:

Formula I

| Component | Pounds/ Batch | % Solids | Pounds/ Solids Film | % Solids |
|---|---|---|---|---|
| 6035 | 100.00 | 35.00% | 35.00 | 53.85% |
| DMF | 130.00 | 0.00% | 0.00 | 0.00% |
| M103 | 21.00 | 100.00% | 21.00 | 32.31% |
| XC72 | 9.00 | 100.00% | 9.00 | 13.85% |
| Totals | 260.00 | 65.00 | 100.00% | 46.15% Carbon |

Formula II

| Component | Pounds/Batch | % Solids | Pounds/ Solids Film | % Solids |
|---|---|---|---|---|
| 6035 | 100.00 | 35.00% | 35.00 | 53.85% |
| DMF | 87.00 | 0.00% | 0.00 | 0.00% |
| M103 | 28.00 | 100.00% | 28.00 | 43.08% |
| XC72 | 15.00 | 100.00% | 15.00 | 23.08% |
| Totals | 230.00 | 78.00 | 120.00% | 66.15% Carbon |

The following procedure, although not limited thereto, was followed to make Formulas I and II in to the composite material:

1. Weigh out carbon black and graphite.
2. Add DMF and mix slowly.
3. Add 35 pounds of the 6035 and continue to mix slowly.
4. Add the remainder of the 6035 and place under Cowles mixer at slow speed.
5. Increase Cowles speed to 1800 rpm and mix for 1 hour, using care to prevent air bubbles.
6. Let stand for 1 hour to allow any air to dissipate.
7. Coat a first pass on matte finish release paper at 70 gsm (grams per square meter).
8. Dry in two stage oven-first stage @ 90° C.; second stage @ 170° C.
9. Coat a second pass on top of first pass @ 90 gsm.
10. Dry in two stage oven-first stage @ 90° C.; second stage @ 170° C.
11. Coat a third pass on top of second pass @ 65 gsm.
12. Dry in two stage oven-first stage @ 90° C.; second stage @ 170° C.
13. Finished product is 215 gsm.

The results were inconsistent between trials with the average resistance of Formula II's ohms varying from 9.5 ohms to 15 ohms at 135 gsm weight. This indicated an inconsistent dispersion of the conductive particles.

Soluol, Inc. (recently acquired by DSM NeoSol, Inc.) has an aliphatic urethane that can withstand the higher loadings and yet provides a tough, flexible film. Solucote® 147-40 ("147-40") is an aliphatic solvent-based urethane with 35% solids by weight. The urethane was cured to increase tenacity and elongation while maintaining pliability. Soluol also provides Solucote® 147-89-1K ("147-89-15K"). 147-89-15K is an improved aliphatic urethane that provides even greater strength.

Various "compatibilizers" were studied and many were trialed. Compatibilizers help to disperse the carbon aggregates into individual particles to a degree sufficient to produce much more predictable results in properties of the end product. Kenrich Petrochemicals, Inc. provides Ken-React® KR® 44 ("KR44") titanate coupling agent. KR44 was chosen because it creates an excellent dispersion with urethane, carbon, and graphite. KR44 is a monoalkoxy titanate (isopropyl, tri(N-ethylenediamino)ethyl titanate). KR44 was found to be effective between 0.1% and 0.8% by weight of the mixture, with the optimum range of 0.3 to 0.7%, although it is not limited to these percentages.

Formulas III and IV, although not limited thereto, were:

Formula III

| Component | Pounds/Batch | | |
|---|---|---|---|
| 147-40 | 150 | lbs | |
| DMF | 225 | lbs | |
| KR44 | 1.4 | lbs | |
| M103 | 48.825 | lbs | |
| BP2000 | 14.1 | lbs | |
| Total | 439.3 | pounds | 25.8% Carbon |

Formula IV

| Component | Pounds/ Batch | % Solids | Pounds/ Solids Film | % Solids | |
|---|---|---|---|---|---|
| 147-89-15K | 150.00 | 35.00% | 52.50 | 45.26% | |
| DMF | 225.00 | 0.00% | 0.00 | 0.00% | |
| KR44 | 1.40 | 40.00% | 0.56 | 0.48% | |
| M103 | 48.83 | 100.00% | 48.83 | 42.10% | |
| BP2000 | 14.10 | 100.00% | 14.10 | 12.16% | |
| Totals | 439.33 | — | 115.99 | 100.00% | 54.25% Carbon |

The following procedure, although not limited thereto, was followed for Formulas III and IV:

1. Mix all of 14740/147-89-15K and 0.5 pounds of KR44 with Cowles mixer for 15 minutes at a tip speed of 430-feet/minute.
2. Mix all of DMF and 0.9 pounds of KR44 by hand until dispersed.
3. Add the 50 pounds of the 14740/147-89-15K/KR44 (from step 1) to the DMF/KR44 (from step 2). Mix with Cowles mixer for 15 minutes at a tip speed of 430-feet/minute or until completely dispersed.
4. Disperse 14.1 pounds of BP 2000 into (147-40147-89)-(15K/DMF/KR44) (from step 3) by hand. Disperse M103 into this batch by hand. Mix with Cowles mixer for 15 minutes at a tip speed of 430-feet/minute or until completely dispersed.
5. Add all remaining (14740/147-89)-(15K/KR44) (from step 1). Mix with Cowles mixer with a tip speed of 1292 feet/minute for 3 hours.
6. Let stand, covered, overnight to remove air bubbles.

An improved aliphatic urethane by DSM Neosol (147-134) provided better results for strength and durability by reducing the amount of DMF to increase the viscosity. Formula V, although not limited there to, was:

Formula V

| Component | Pounds/ Batch | % Solids | Pounds/ Solids Film | % Solids |
|---|---|---|---|---|
| Solucoat 147-134 | 150 | 35% | 52.5 | 45.26% |
| DMF | 180 | 0% | 0.0 | 0.0% |
| KR44 | 1.4 | 40% | 0.56 | 0.48% |
| Graphite M103 | 48.825 | 100% | 48.825 | 42.10% |
| Carbon BP2000 | 14.1 | 100% | 14.1 | 12.16% |
| Totals | 394.32 | 115.99 | 100% | 27.4% Carbon |

The following procedure, although not limited to this procedure, was followed for Formula V and improved the dispersion qualities:

1. Mix 150 pounds of Solucoat 147-134 (Soluol) and 0.5 pound KR 44 (Kenrich) with Cowles mixer for 15 minutes at a tip speed of 430-feet/minute.
2. Mix 0.9 pounds KR 44 (enrich) and 180 pounds DMF by hand until dispersed
3. Add the 50 pounds of the Soluol/KR44 (from step 1) to the DMF/KR44 (from step 2) and mix with Cowles mixer for 15 minutes at a tip speed of 430-feet/minute or until completely dispersed.
4. Disperse 14.1 pounds of BP 2000 into 147-134/DMF/KR44 (from step 3) by hand. Disperse M103 into this batch by hand. Mix with Cowles mixer for 15 minutes at a tip speed of 430-feet/minute or until completely dispersed.
5. Add all remaining (100.5 pounds) Soluol 147-134/KR44 from step 1 and mix with Cowles mixer with a tip speed of 1292 feet/minute for 3 hours.

Using Formula V, samples sized 6.3"×11" (16 cm×28 cm) were made and electrical tests were performed. With composite material of only 6.3" wide the temperature got up to 280° F. The results for Formula V were as follows:

Sample 1-185 gsm-Across 6" Dimension-4.7 Ohms

-continued

| Volts | Amps | Watts/ft$^2$ | Temp ° F. | Temp ° C. |
|---|---|---|---|---|
| 12.00 | 2.25 | 60.8 | 126.0 | 52.2 |
| 15.00 | 2.75 | 113.4 | 153.0 | 67.2 |
| 20.00 | 3.59 | 257.8 | 200.0 | 93.3 |
| 25.00 | 4.40 | 484.0 | 238.0 | 114.4 |
| 28.00 | 5.02 | 705.6 | 280.0 | 137.8 |

Note:
28.0 V was maximum capability of power supply

Sample 2-220 gs-Electrodes 6" Dimension-4.4 Ohms

| Volts | Amps | Watts/ft$^2$ | Temp ° F. | Temp ° C. |
|---|---|---|---|---|
| 12.00 | 2.42 | 70.3 | 119.0 | 48.3 |
| 15.00 | 3.05 | 139.5 | 140.0 | 60.0 |
| 20.00 | 3.95 | 312.1 | 168.0 | 75.6 |
| 25.00 | 4.92 | 605.2 | 222.0 | 105.6 |
| 25.40 | 5.05 | 647.8 | 235.0 | 112.8 |

Note:
25.4 V was maximum capability of power supply

Sample 3-185 gsm-Electrodes Across 11" Dimension-1.6 Ohms

| Volts | Amps | Watts/ft$^2$ | Temp ° F. | Temp ° C. |
|---|---|---|---|---|
| 12.00 | 0.98 | 11.5 | 106.0 | 41.1 |
| 15.00 | 1.22 | 22.3 | 113.0 | 45.0 |
| 20.00 | 1.58 | 49.9 | 130.0 | 54.4 |
| 25.00 | 1.95 | 95.1 | 143.0 | 61.7 |
| 30.00 | 2.30 | 158.7 | 156.0 | 68.9 |

Sample 4-220 gsm-Electrodes Across 11" Dimension-10.2 Ohms

| Volts | Amps | Watts/ft$^2$ | Temp ° F. | Temp ° C. |
|---|---|---|---|---|
| 12.00 | 1.13 | 15.3 | 106.0 | 41.1 |
| 15.00 | 1.41 | 29.8 | 113.0 | 45.0 |
| 20.00 | 1.85 | 68.5 | 128.0 | 53.3 |
| 25.00 | 2.26 | 127.7 | 149.0 | 65.0 |
| 30.00 | 2.68 | 215.5 | 172.0 | 77.8 |

The coating was performed in a continuous line using a multi-station knife over a roll coater and onto polyethylene-coated release paper. Each coating head (of 4, although not limited to this number of coatings) applied 55 gsm of the formula above for a total weight of 220 gsm, although not limited to these amounts. Between each coating the film was subjected to 165° F.-(75° F.) for about a minute to evaporate the DMF. After the 4th coating the film was heated to 165° F. to insure full evaporation of DMF. The aggregate film was then subjected to 350° F. (177° C.) for 90 seconds to cure the compound. The film was then peeled from the release paper and was ready for use. The release paper may be used again. A second film was produced using the same 4 heads with a finished weight of 185 gsm.

It was determined that as the percent solids was increased to obtain maximum conductivity with the addition of KR44, the solution would become exothermic if the mixing speed was too high. With Cowles mixing blade tip speeds of 2000 feet/minute and above, the temperature would increase to over 50° C., which would result in the evaporation of the DMF and a poorly formed film. The ideal tip speed was found to be between 1100 and 1500 feet per minute with the optimum at 1,292 feet/minute, although it is not limited to this procedure.

It was determined that the best conductivity was created by making multiple thin layers of coating rather than one heavy layer, although not limited to this process. In order to achieve 220-gsm weight, four layers of 55 gsm were formed. This created additional paths for the electrons to follow and prevented any voids of poor conductivity.

To improve the durability of the conductive film it may be laminated to a woven, knit, nonwoven, leather, foam or other substrate, although not limited to these processes. The lamination may take place during the coating process by placing the substrate into the last coating while still in liquid form. In addition, the substrate may be laminated in a subsequent operation utilizing an adhesive.

Applications for this invention, although not limited thereto, include:

(a) sleep, comfort and rest items such as mattresses pads with multiple heating zones, garments for adults, children and annuals, cribs, infant incubators, sleeping bags, sleeping pads, heating pads, arm and leg wraps for both humans and animals, infant formula bags, stadium seating pads, pet beds, post-operative warming suits and ambulance heating blankets;

(b) enclosures such as medical cabinets, food delivery bags, food display cases, chemical and other process pipe heating, chemical drum and other storage vessel heaters, freeze protection for outdoor devices (i.e., electronics), pipe wraps;

(c) larger products and transport items such as floors, plant heating in greenhouses, steering wheels, auto seats, agricultural vehicle seats, airplane seats, operating room tables, tent floors, fruit juice processing piping, light aircraft floors, aircraft de-icing blankets, concrete curing blankets, roof de-icing equipment, patio carpets, athletic fields, driveways;

(d) miscellaneous smaller products such as battery beaters for gloves, ski boots, shoes/slippers and other articles of clothing, wetsuits, incubators for baby chickens/eggs, ice scraper mats, and hot plates;

(e) roof membranes and many walkways;

(f) covers and wraps for industrial process conduits and storage vessels (tanks) of solid materials or liquids or gasses to reliably control temperature in the conduit or vessel (product quality and continuity of static and flow through processes are often critically dependent on such control);

(g) door-mats, wraps, and other coverings for zones exposed to liquids, snow, ice and/or high moisture vapors, including porches, foyers, doorways, outdoor spectator events, personal environments, hunting/fishing activities and the like.

For automotive seating applications, a film of at least 200 gsm is best, although not limited to this embodiment. Generally, it must be laminated to a fabric (nonwoven, knit, or woven) to enhance the strength of the film. Auto seats must be very durable and must resist damage from heavy weights, knee punctures, or stresses caused by long term movement. The laminate may be placed on top of the foam bun of the seat and under the seat fabric or leather.

Figure 6:
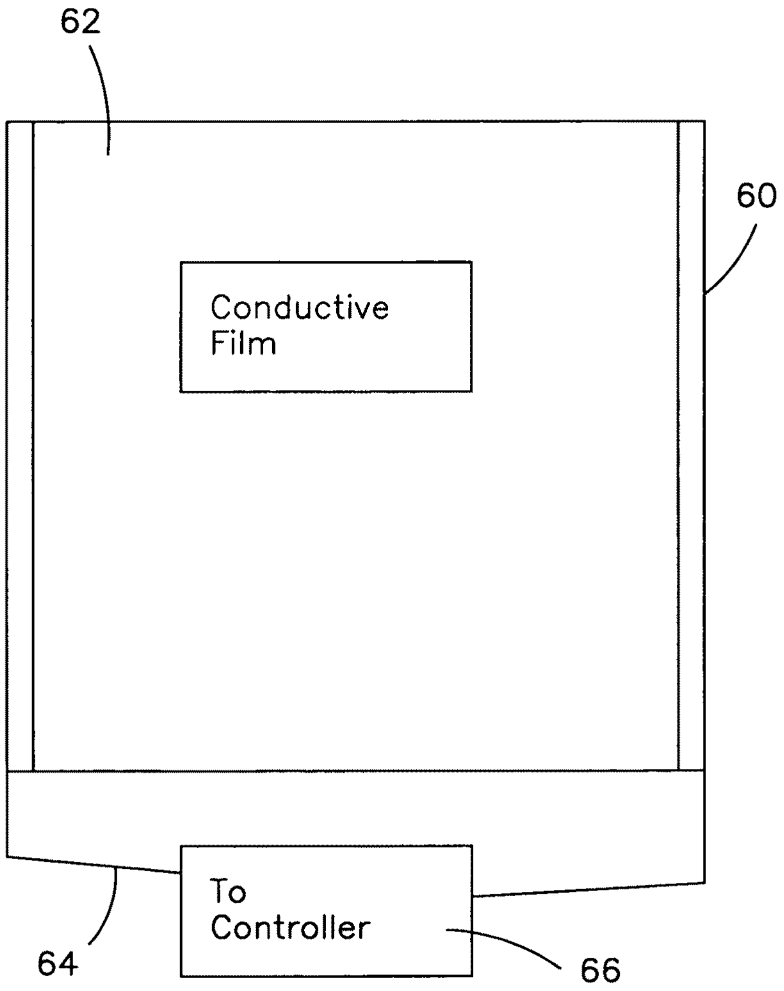
FIG. 6 is another schematic diagram of an automotive seat incorporating the composite material of FIG. 1, 2A or 2B.

FIG. 6 is another schematic diagram of an automotive seat constructed with the composite material of FIG. 1, 2A or 2B. Generally, a conductive bus 60 is laminated or attached to the film on the left and right side of the composite material 62, which is then attached to wires 64 that lead to the controller 66. The conductive bus 60 may be a copper or aluminum wire, a sewn in conductive thread, or a strip of conductive copper tape, although not limited to these. The wires 64 may then be run under the seat to the automobile instrument panel.

The conductive bus 60 (or connector) may be as simple as conductive tape, although any conductive material may be used Chomerics CCK-36-101-0050 is a tinned copper tape with a conductive adhesive and release paper. This tape is 112" wide, although any width tape would work. The tape may be run down opposites side of the composite material. A conductive bus 60 of conductive tape supplied by Ted Pella, Inc. also worked well. Ted Pella, Inc. (www.tedpella.com) supplies both type 16072 copper conductive tape in 6.3 mm (¼") wide as well as 16072-1 copper conductive tape in 12.7 mm (½") wide. Wires 64 may then be soldered to the tape and connected to the controller 66.

The temperature controller 66 may be one of two types: Constant voltage or Cycling voltage.

Constant Voltage:

In this case, the voltage is set by the controller to achieve a desired temperature. Because the film maintains constant resistance, a constant voltage will yield a constant temperature. For example, the controller may have 4 set points of 6, 10, 12, and 14 volts, although not limited to this embodiment. Each one will result in a constant temperature to meet the comfort of the occupant. In another variant, the controller could start at the higher voltage for quick warm up and then reduce to a lower setting for long-term comfort. Because the temperature remains constant at a constant voltage, the composite material is considered "self-regulating" in automotive standards, but may be employed with sensors and feedback controllers.

Cycling Voltage:

In this case, the voltage supplied is the nominal operating voltage of the vehicle (typically 12.5 to 14.5 VDC). The controller senses the temperature of the seat through a thermocouple or thermostat. The controller cycles the power on and off to bring the temperature to the desired level. The temperature may be chosen by the occupant. In traditional heating methods (e.g., heated wires, etc.), this type of controller system is not considered "self-regulating" because the temperature could "run away" with a failure of the temperature-sensing device. With the composite material, however, even if the controller system fails, constant voltages provide constant temperatures because the resistance of the composite material does not change with temperature.

Figure 7:
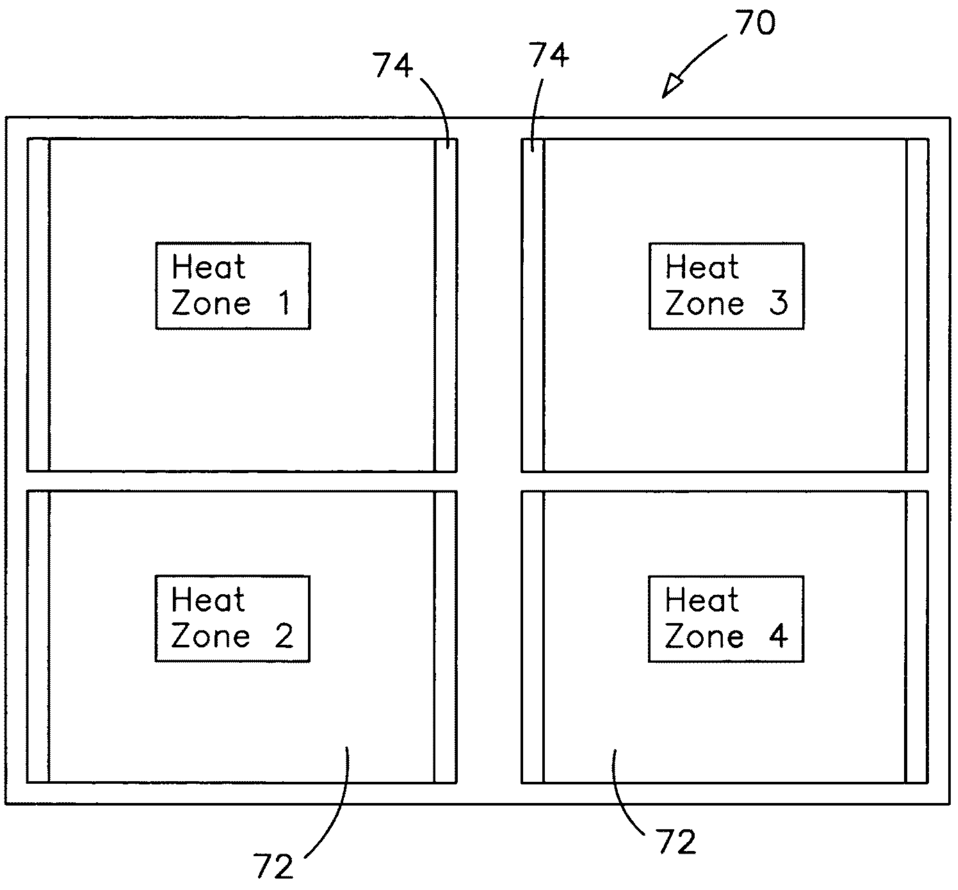
FIG. 7 is a schematic diagram of a heated mattress incorporating the composite material of FIG. 1, 2A or 2B.
Figure 8:
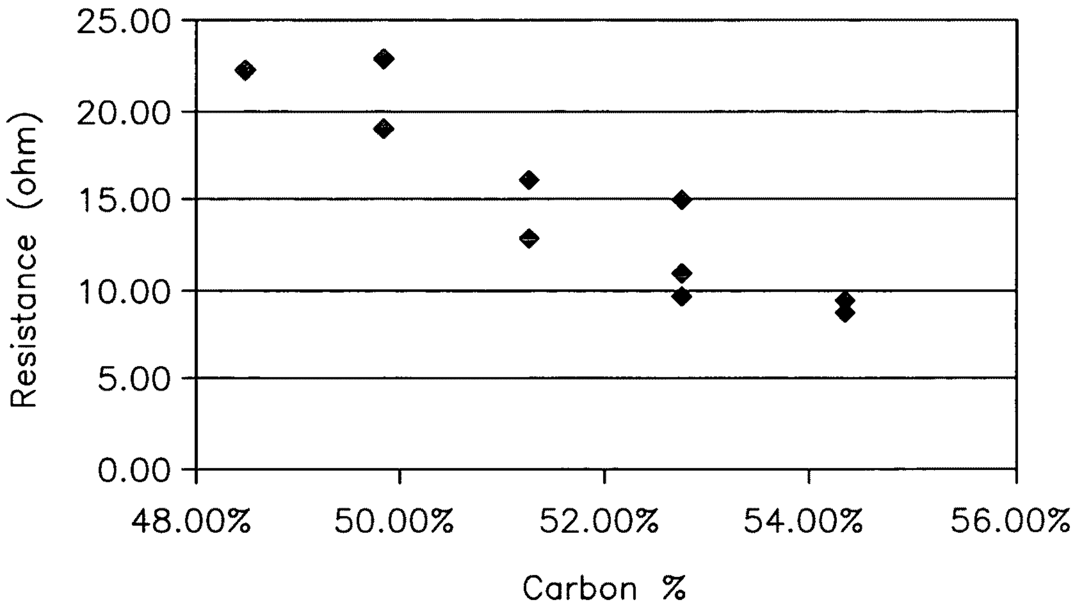
FIG. 8 is a graph of certain test results.

FIG. 7 is a schematic diagram of a heated mattress with several "zones" of composite material 72. Multiple zones may permit the user of the mattress to maintain different temperatures in different zones of the mattress 72. Multiple people in the bed may choose different temperatures for their own comfort.

Electric blankets have long been used to provided heating for a bed. However, electric blankets are not comfortable because of the heated wires, which can be felt within the blanket structure. People are also concerned about electrical hazards from shock or fire with wires close to the body. Finally, the electric blanket is on top of the person, and since heat rises, the heating function is not very efficient.

In this embodiment, the film may be laminated to a fabric (nonwoven, knit, or woven) to provide improved durability and flexibility during wear. It must be resistant to knee puncture as well as long-term flexing during normal mattress use. Further, the film may be perforated to allow for the movement of moisture vapor through the construction of the mattress. The composite material also will not short-circuit if it gets wet, removing one concern that consumers have with the risk of burns and electrocution. The multiple conductive path structure of the films of the present invention tolerates small vapor passage holes very well without substantial loss of electrical and physical properties.

The composite material would normally be placed above the coils or foam that is in the center of the mattress. It will then be below the surface fabric of the mattress and may be between the many layers of "stuffing" in a normal mattress. In addition, the composite material may be used to construct a mattress pad which could be used on top of a traditional mattress to provide safe, reliable heat at a constant low voltage. Mattress pads have the additional benefit of being able to be removed and cleaned.

The composite material may be in one complete zone from head to toe (e.g., 1 meter wide by 2 meters long, although not limited thereto) or it could be divided into two pieces, one for the upper torso and one for the lower torso. Further, in a bed for two people, there could be a separate film for each occupant of the bed, permitting individual control of temperature to an individual taste. It is appreciated that any number of zones may be created from separate sections of composite material in order to customize a heating solution to be suitable for any particular scenario and the composite material should not be limited to these particular embodiments.

Typically, each heating film section would have a conductive bus running down each side from head to toe. The bus would be connected to wires, which would be connected to a controller. The bus may be made from copper or aluminum wires, conductive thread, or conductive tape, although not limited to these particular materials.

The controller would use normal household power (120 VAC in US and Canada or 240 AC in the rest of the world). The power would then be converted to a lower voltage suitable for the temperature desired. A range of settings would be available to the occupant to chose the desired temperature.

In this application, a lighter weight film could be chosen because higher voltages (and amperages) are available. This will result in a lower cost of the conductive film. However, because of marketing considerations, a lower voltage may be chosen, thus requiring a heavier film. One advantage of the composite material is that the mass of the film may be varied for any particular end-use.

During subsequent trials, standard formulas were run and additional extrapolated formulas were considered (proposed):

| Material | Qty | % Solids | Solid # |
|---|---|---|---|
| Standard Formula | | | |
| 147-134 | 150.000 | 35.00% | 52.500 |
| DMF | 180.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 394.325 | | 115.775 |
| Total Solids | | 29.36% | |
| Percent Carbon | | 54.35% | |
| Proposed #1 | | | |
| 147-134 | 160.000 | 35.00% | 56.000 |
| DMF | 180.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 404.325 | | 119.275 |
| Total Solids | | 29.50% | |
| Percent Carbon | | 52.76% | |

-continued

| Material | Qty | % Solids | Solid # |
|---|---|---|---|
| Proposed #2 | | | |
| 147-134 | 170.000 | 35.00% | 59.500 |
| DMF | 180.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 414.325 | | 122.775 |
| Total Solids | | 29.63% | |
| Percent Carbon | | 51.25% | |
| Proposed #3 | | | |
| 147-134 | 150.000 | 35.00% | 52.500 |
| DMF | 170.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 384.325 | | 115.775 |
| Total Solids | | 30.12% | |
| Percent Carbon | | 54.35% | |
| Proposed #4 | | | |
| 147-134 | 160.000 | 35.00% | 56.000 |
| DMF | 170.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 394.325 | | 119.275 |
| Total Solids | | 30.25% | |
| Percent Carbon | | 52.76% | |
| Proposed #5 | | | |
| 147-134 | 160.000 | 35.00% | 56.000 |
| DMF | 160.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 384.325 | | 119.275 |
| Total Solids | | 31.03% | |
| Percent Carbon | | 52.76% | |
| Proposed #6 | | | |
| 147-134 | 170.000 | 35.00% | 59.500 |
| DMF | 160.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 394.325 | | 122.775 |
| Total Solids | | 31.14% | |
| Percent Carbon | | 51.25% | |
| Proposed #7 | | | |
| 147-134 | 180.000 | 35.00% | 63.000 |
| DMF | 160.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 404.325 | | 126.275 |
| Total Solids | | 31.23% | |
| Percent Carbon | | 49.83% | |
| Proposed #8 | | | |
| 147-134 | 180.000 | 35.00% | 63.000 |
| DMF | 150.000 | 0.00% | 0.000 |
| KR44 | 1.400 | 25.00% | 0.350 |

-continued

| Material | Qty | % Solids | Solid # |
|---|---|---|---|
| M103 Graphite | 48.825 | 100.00% | 48.825 |
| BP2000 Carbon | 14.100 | 100.00% | 14.100 |
| Totals | 394.325 | | 126.275 |
| Total Solids | | 32.02% | |
| Percent Carbon | | 49.83% | |
| | Proposed #9 | | |
| 147-134 | 190.000 | 35.00% | 66.500 |
| DMF | 150.000 | 0.00% | 0.000 |
| KR44 | 1.400 | 25.00% | 0.350 |
| M103 Graphite | 48.825 | 100.00% | 48.825 |
| BP2000 Carbon | 14.100 | 100.00% | 14.100 |
| Totals | 404.325 | | 129.775 |
| Total Solids | | 32.10% | |
| Percent Carbon | | 48.49% | |

Testing the standard formula 0 and extrapolating for the proposed formulas 1-9 shows for 0 indicating for 1-9 the following results:

| Form. | Wgt (gsm) | Solids % | Carbon % | Resist ohm | Temp C. | Amps | Thick. (in) | Tensile | Elong. | Tear |
|---|---|---|---|---|---|---|---|---|---|---|
| 0 | 210 | 29.36% | 54.35% | 9.20 | 64.0 | 1.48 | 0.0078 | 2,188.0 | 13.0% | 128.2 |
| 1 | 224 | 29.50% | 52.76% | 14.80 | 47.0 | 0.93 | 0.0080 | 1,961.0 | 40.0% | 125.0 |
| 2 | 232 | 29.63% | 51.25% | 12.10 | 53.0 | 1.15 | 0.0080 | 1,698.0 | 33.0% | 187.5 |
| 3 | 212 | 30.12% | 54.35% | 9.80 | 64.0 | 1.35 | 0.0068 | 2,287.0 | 13.0% | 132.4 |
| 4 | 211 | 30.25% | 52.76% | 11.40 | 50.0 | 1.19 | 0.0072 | 2,088.0 | 23.0% | 138.9 |
| 5 | 217 | 31.03% | 52.76% | 9.70 | 67.0 | 1.47 | 0.0060 | 2,359.0 | 20.0% | 116.7 |
| 6 | 208 | 31.14% | 51.25% | 16.90 | 45.0 | 0.82 | 0.0058 | 2,080.0 | 23.0% | 103.4 |
| 7 | 234 | 31.23% | 49.83% | 21.40 | 41.0 | 0.72 | 0.0058 | 2,132.0 | 37.0% | 122.4 |
| 8 | 224 | 32.02% | 49.83% | 18.80 | 40.0 | 0.78 | 0.0059 | 2,066.0 | 27.0% | 135.6 |
| 9 | 210 | 32.10% | 48.49% | 23.40 | 40.0 | 0.60 | 0.0065 | 2,253.0 | 33.0% | 153.8 |
| | | | Adjust Formulas by Weight to 220 gsm | | | | | | | |
| 0 | 210 | 29.36% | 54.35% | 8.78 | 67.0 | 1.55 | 0.0082 | 2,292.2 | 12.4% | 134.3 |
| 1 | 224 | 29.50% | 52.76% | 15.07 | 46.2 | 0.91 | 0.0079 | 1,926.0 | 40.7% | 122.8 |
| 2 | 232 | 29.63% | 51.25% | 12.76 | 50.3 | 1.09 | 0.0076 | 1,610.2 | 34.8% | 177.8 |
| 3 | 212 | 30.12% | 54.35% | 9.44 | 66.4 | 1.40 | 0.0071 | 2,373.3 | 12.5% | 137.4 |
| 4 | 211 | 30.25% | 52.76% | 10.93 | 52.1 | 1.24 | 0.0075 | 2,177.1 | 22.1% | 144.8 |
| 5 | 217 | 31.03% | 52.76% | 9.57 | 67.9 | 1.49 | 0.0061 | 2,391.6 | 19.7% | 118.3 |
| 6 | 208 | 31.14% | 51.25% | 15.98 | 47.6 | 0.87 | 0.0061 | 2,200.0 | 21.7% | 109.4 |
| 7 | 234 | 31.23% | 49.83% | 22.76 | 38.5 | 0.68 | 0.0055 | 2,004.4 | 39.4% | 115.1 |
| 8 | 224 | 32.02% | 49.83% | 19.14 | 39.3 | 0.77 | 0.0058 | 2,029.1 | 27.5% | 133.2 |
| 9 | 210 | 32.10% | 48.49% | 22.34 | 41.9 | 0.63 | 0.0068 | 2,360.3 | 31.5% | 161.1 |

| Sort by Carbon % | | | | | | | | |
|---|---|---|---|---|---|---|---|---|
| Formula | Original Wgt GSM | Adjust Wgt GSM | Solids % | Carbon % | Resist ohm | Temp C. | Amps | Thickness Inches |
| 9 | 210 | 220 | 32.10% | 48.49% | 22.34 | 41.9 | 0.63 | 0.0068 |
| 7 | 234 | 220 | 31.23% | 49.83% | 22.76 | 38.5 | 0.68 | 0.0055 |
| 8 | 224 | 220 | 32.02% | 49.83% | 19.14 | 39.3 | 0.77 | 0.0058 |
| 2 | 232 | 220 | 29.63% | 51.25% | 12.76 | 50.3 | 1.09 | 0.0076 |
| 6 | 208 | 220 | 31.14% | 51.25% | 15.98 | 47.6 | 0.87 | 0.0061 |
| 1 | 224 | 220 | 29.50% | 52.76% | 15.07 | 46.2 | 0.91 | 0.0079 |
| 4 | 211 | 220 | 30.25% | 52.76% | 10.93 | 52.1 | 1.24 | 0.0075 |
| 5 | 217 | 220 | 31.03% | 52.76% | 9.57 | 67.9 | 1.49 | 0.0061 |
| 0 | 210 | 220 | 29.36% | 54.35% | 8.78 | 67.0 | 1.55 | 0.0082 |
| 3 | 212 | 220 | 30.12% | 54.35% | 9.44 | 66.4 | 1.40 | 0.0071 |

| Thickness mm | Tensile | Elongation | Tear |
|---|---|---|---|
| 1.7296 | 2,360.3 | 31.5% | 161.1 |
| 1.3851 | 2,004.4 | 39.4% | 115.1 |
| 1.4718 | 2,029.1 | 27.5% | 133.2 |
| 1.9269 | 1,610.2 | 34.8% | 177.8 |
| 1.5582 | 2,200.0 | 21.7% | 109.4 |
| 1.9957 | 1,926.0 | 40.7% | 122.8 |
| 1.9068 | 2,177.1 | 22.1% | 144.8 |
| 1.5451 | 2,391.6 | 19.7% | 118.3 |
| 2.0755 | 2,292.2 | 12.4% | 134.3 |
| 1.7924 | 2,373.3 | 12.5% | 137.4 |

The Carbon % and Resistance values of the weighted table above (adjusted to 220 gsm) may be graphed as shown in FIG. 9. The graph shows that as the percentage of carbon increases, the resistance of the composite material falls predictably.

It is appreciated that many applications exist for the composite material, and it is not limited to the specific applications listed. Any application where heat is desired is a potential application for the composite material.

While the present teachings have been described above in terms of specific embodiments, it is to be understood that the invention is not limited to these disclosed embodiments. Many modifications and other embodiments of the invention will come to mind to those skilled in the art to which this invention pertains, and which are intended to be and are covered by both this disclosure and the appended claims. It is intended that the scope of the invention should be determined by proper interpretation and construction of the appended claims and their legal equivalents, as understood by those of skill in the art relying upon the disclosure in this specification and the attached drawings.

What is claimed is:

1. A composite material comprising:

a mixture of carbonaceous material including carbon and graphite in a pre-defined ratio and greater than 1 micron in particle size, an essentially non-conductive film-forming thermoplastic polymer matrix product defining vapor passage holes after the product is formed, the carbonaceous material after intermixture within the thermoplastic polymer matrix product comprises at least two diverse conductive carbon forms differing by composition, microstructure, size, shape and morphology and dispersed homogeneously in the matrix product forming a composite material to provide a stable electrical resistance heating capability and intrinsic physical stability, wherein the carbonaceous material comprises from 30% to 50% of the overall solid material dry weight;

the composite material forming a high multiplicity of separate low micro-amperage paths through it in x, y, z dimensions aggregating to adequate amperage for heating, and wherein the high multiplicity of separate low micro-amperage paths substantially maintain electrical and physical properties in the presence of water passing through the vapor passage holes and a dispersing agent compatibilizer isopropyl, tri (N-ethylenediamino) ethyl titanate between 0.1% to 0.8% by weight of the mixture added and mixed with the carbonaceous material at low shear rates to avoid over-compounding, the dispersing agent for assisting to disperse carbon aggregates with a complete or near complete dispersion of the carbon and graphite in the composite material and into individual particles to produce uniform and predictable results in electrical properties, and when electricity is passed through the mixture a predictable heating profile of the composite material is created, wherein a constant resistance is provided by the composite material and constant voltage produces a constant temperature by the composite material as resistance of the composite remains constant even with changing temperature; to provide a self-regulated heating material and wherein a predictable heating profile is created in the composite material by varying the carbon and graphite types and the pre-defined ratio.

2. The composite material of claim 1 wherein the diverse elements of the carbonaceous material comprise carbon black and graphite the weight ratio of graphite to carbon black being from about 1:3 to about 3:1.

3. The composite material of claim 1 wherein the matrix is an aliphatic urethane.

4. The composite material of claim 1 as a free standing film.

5. The composite material of claim 1 coated on a substrate or as part of a laminate.

6. The composite material of claim 1 further comprising spaced electrodes mounted thereon.

7. The composite material of claim 1 wherein the matrix is a thermoplastic polymer of the class of polyolefins, polyesters including polyethylene terephthalate, terpolymer resins, polyamides, ethylene vinyl acetate, aliphatic and aromatic urethanes and other flexible polymers.

8. The composite material of claim 1, wherein the dispersing agent compatibilizer is between 0.3% to 0.7% by weight of the mixture.

9. A method of making a composite material for electrical heating, comprising: a) combining diverse carbonaceous material including types of carbon and graphite particles of different shapes in a pre-defined ratio and greater than 1 micron in particle size, and a carrier material, one or more of such components being a liquid solvent or caustic, into a homogeneous mixture dispersed in a liquid, and adding and mixing with the carbonaceous material at low shear rates to avoid over-compounding a dispersing agent compatibilizer isopropyl, tri (N-ethylenediamino) ethyl titanate between 0.1% to 0.8% by weight of the mixture for assisting to disperse carbon aggregates into individual particles with complete or near complete dispersion of the carbon and graphite in the composite material and to produce uniform and predictable results in electrical properties, wherein the carbonaceous material comprises from 30% to 50% of the overall solid material dry weight;

b) spreading a layer of the mixture over a surface to dry in at least one pass, and c) drying each layer of the mixture so that the carbonaceous material is substantially wholly freed of solvents and remains dispersed to provide adequate and consistent conductivity/resistivity to heat by resistance heating when an electric current is run through it, wherein the composite material forms a multiple conductive path of divided low micro-amperage and wherein a constant resistance is provided by the composite material and constant voltage produces a constant temperature by the composite material as resistance of the composite remains constant even with changing temperature to provide a self-regulated heating material;

d) perforating the layers to form vapor passage holes for movement of moisture vapor, wherein the multiple conductive path structure tolerates the vapor passage holes without substantial loss of electrical and physical properties in the presence of water passing through the vapor passage holes; and e) varying the carbon and graphite types and ratios having the particle size greater than 1 micron to obtain a predictable heating profile in the composite.

10. The method of claim 9 further comprising repeating steps a-c to add at least one additional layer of the mixture with solvent remove at the end of each pass and a final cure step to establish a multi-layer film essentially free of non-conductive barrier at the layers' interface(s).

11. The method of claim 9 wherein the carbonaceous material comprises carbon black and graphite.

12. The method of claim 9 wherein the carrier is an aliphatic urethane.

13. The method of claim 9, wherein the dispersing agent compatibilizer is between 0.3% to 0.7% by weight of the mixture.

14. A product containing an electrical heating component of a composite material, comprising:

carbonaceous material including carbon and graphite of two or more types differing by size, morphology, composition or microstructure and in a pre-defined ratio with each other and having a particle size greater than 1 micron, wherein the carbonaceous material compromises from 30% to 50% of the overall solid material dry weight;

an essentially non-conductive film-forming thermoplastic polymer matrix product defining vapor passage holes after the product is formed, wherein said carbonaceous material is dispersed and forming a high multiplicity of divided, low micro-amperage current paths in x, y and z dimensions of the component to provide heat by resistance when an electric current is passed through it, and wherein the high multiplicity of divided, low micro-amperage current paths substantially maintain electrical and physical properties in the presence of water passing through the vapor passage holes and a dispersing agent compatibilizer isopropyl, tri (N-ethylenediamino) ethyl titanate between 0.1% to 0.8% by weight added and mixed with the carbonaceous material at low shear rates to avoid over-compounding, the dispersing agent for assisting to disperse carbon aggregates into individual particles with complete or near complete dispersion of the carbon and graphite in the composite material and to produce uniform and predictable results in electrical properties, and means for connecting the composite material to an electrical voltage source, and constructed and arranged so that the composite material can heat the apparatus with a stable heating effect in relation to one or more levels of applied voltage, wherein a constant resistance is provided by the composite material and constant voltage produces a constant temperature as resistance of the composite remains constant even with changing temperature providing a self-regulated heating material; and wherein a predictable heating profile is created in the composite material by varying the carbon and graphite types and the pre-defined ratio.

15. The product of claim 14 wherein the carbonaceous material comprises a carbon graphite uniformly admixed and dispersed throughout the component.

16. The product of claim 14 wherein the matrix is an aliphatic urethane.

17. The product of claim 14 wherein the electrical source provides direct current.

18. The product of claim 14 wherein the voltage of the source is in a range of 2 to 50 volts in DC or AC.

19. The product of claim 14 further comprising an electrical controller to vary the voltage and temperature in the composite material.

20. The product of claim 14 as laminated to a strengthening or surface protective material.

21. The product of claim 14 as incorporated or incorporateable into a mattress.

22. A mattress or mattress pad product incorporating the product of claim 21 in combination with a power supply operatively connected or connectable therein.

23. The product of claim 14 as incorporated or incorporateable into clothing article selected from the class of mittens, gloves, socks, leg warmers, shoes, innersoles, slippers, scarfs, hats/headbands, shirts, trousers, skirts, jackets, vests, dresses, jumpers, coats, underwear and liners.

24. The product of claim 14 as incorporated or incorporateable into an automotive seat or back seat or heating pad mountable on an auto seat or back.

25. An auto or bus seat or auto seat or back mountable pad or steering wheel product incorporating the product of claim 24 in combination with a power supply operatively connected or connectable therein.

26. A clothing article comprising the products of claim 23 in combination with a power supply operatively connected or connectable therein.

27. A membrane roofing or walkway product incorporating the product of claim 14 to melt or prevent the formation of ice on roof walkways, other roof areas of buildings.

28. The product of claim 24 in combination with a power supply.

29. A covering or wrapping product for fluid or solid material conduits or storage vessels incorporating the product of claim 14.

30. The product of claim 29 in combination with a power supply.

31. Articles designed and constructed for exposure to liquid or moisture vapor incorporating the product of claim 14.

32. The product of claim 31 in combination with a power supply.

33. The product of claim 14, wherein the dispersing agent compatibilizer is between 0.3% to 0.7% by weight.

* * * * *